United States Patent
Onodera et al.

(10) Patent No.: US 7,437,893 B2
(45) Date of Patent: Oct. 21, 2008

(54) METHOD FOR PRODUCING OPTICAL GLASS

(75) Inventors: Kumi Onodera, Sakura (JP); Manabu Saitou, Sakura (JP); Masahiro Horikoshi, Sakura (JP)

(73) Assignee: Fujikura Ltd., Tokyo (JP)

( * ) Notice: Subject to any disclaimer, the term of this patent is extended or adjusted under 35 U.S.C. 154(b) by 520 days.

(21) Appl. No.: 10/504,876

(22) PCT Filed: Feb. 18, 2003

(86) PCT No.: PCT/JP03/01724

§ 371 (c)(1),
(2), (4) Date: Aug. 17, 2004

(87) PCT Pub. No.: WO03/070652

PCT Pub. Date: Aug. 28, 2003

(65) Prior Publication Data

US 2005/0274150 A1    Dec. 15, 2005

(30) Foreign Application Priority Data

Feb. 20, 2002  (JP) .............................. 2002-043795
Jan. 22, 2003  (JP) .............................. 2003-013523

(51) Int. Cl.
    *C03B 37/018*  (2006.01)
(52) U.S. Cl. ........................................ 65/421; 65/531
(58) Field of Classification Search .................... 65/614, 65/421, 17.4, 531, 416, 414
    See application file for complete search history.

(56) References Cited

U.S. PATENT DOCUMENTS

| | | | |
|---|---|---|---|
| 4,388,095 A | * | 6/1983 | Schneider et al. ............. 65/417 |
| 4,810,189 A | | 3/1989 | Mikami et al. |
| 5,207,813 A | * | 5/1993 | Danzuka et al. ............... 65/414 |
| 5,597,398 A | * | 1/1997 | Ishikawa et al. .............. 65/413 |
| 2002/0189298 A1 | * | 12/2002 | Arima et al. .................. 65/531 |
| 2004/0112092 A1 | * | 6/2004 | Roba et al. .................... 65/414 |

FOREIGN PATENT DOCUMENTS

| JP | 62-187135 A | 8/1987 |
|---|---|---|
| JP | 6-24783 A | 2/1994 |
| JP | 6-247722 A | 9/1994 |

(Continued)

OTHER PUBLICATIONS

International Preliminary Report on Patentability, mailed Aug. 31, 2006, for International Application No. PCT/US2005/004534.

*Primary Examiner*—Carlos Lopez
(74) *Attorney, Agent, or Firm*—Sughrue Mion, PLLC

(57) ABSTRACT

This invention provides a method for manufacturing an optical glass in order to prevent the deterioration of the burner used in the synthesis of glass particles that form the optical glass, and to obtain a stable quality optical glass. In this invention, the number of residual bubbles with a diameter of 0.3 mm and more is 0.005/cm$^3$ or less per unit volume of the optical glass. Such optical glass is obtained by controlling the temperature of an end face of the burner for glass synthesis during the deposition of the glass particles by regulating the relationship of the flow velocity or the flow volume between an inflammable gas and a combustion-supporting gas.

8 Claims, 2 Drawing Sheets

FOREIGN PATENT DOCUMENTS

| | | |
|---|---|---|
| JP | 7-109133 A | 4/1995 |
| JP | 7-138028 A | 5/1995 |
| JP | 7-215727 A | 8/1995 |
| JP | 9-12322 A | 1/1997 |
| JP | 9-295826 A | 11/1997 |
| JP | 10-53428 A | 2/1998 |
| JP | 10-114533 A | 5/1998 |
| JP | 10-167748 A | 6/1998 |
| JP | 2793617 B2 | 6/1998 |
| JP | 11-29331 A | 2/1999 |
| JP | 11-79774 A | 3/1999 |
| JP | 11-125406 A | 5/1999 |
| JP | 2000-220810 A | 8/2000 |
| JP | 2000-272929 A | 10/2000 |
| JP | 2000-272930 A | 10/2000 |
| JP | 2000-319024 A | 11/2000 |
| JP | 2001-80923 A | 3/2001 |
| JP | 2003252643 A * | 9/2003 |

* cited by examiner

METHOD FOR PRODUCING OPTICAL GLASS

BACKGROUND OF THE INVENTION

1. Field of the Invention

The present invention relates to an optical glass and a manufacturing method, thereof, and in particular to a manufacturing method of the optical glass that prevents deterioration of the burner used for synthesizing the glass particles that form the optical glass, and obtains an optical glass having a stable quality.

2. Description of the Related Art

As a manufacturing method of an optical fiber perform as an example of an optical glass, there are methods such as the VAD method, OVD method, MCVD method, PCVD method and the like. Among these, in the OVD (Outside Vapor Phase Deposition) method, a glass source material gas such as silicon tetrachloride ($SiCl_4$) is ejected along with a doping gas such as oxygen or hydrogen, an inflammable gas such as hydrogen, and a combustion-supporting gas such as oxygen, and the glass particles are synthesized by hydrolyzed or oxidized the glass source material gas in the flame. Glass particles (soot) are deposited in the radial direction on the peripheral portion of the cylindrical starting material that rotates around its axis and provides the glass that will become a core, and a porous layer comprising a plurality of layers is formed so as to provide a porous body for the optical fiber. This porous body is converted into a transparent glass in an electrical furnace, and thereby the optical fiber perform is manufactured (refer to U.S. Pat. No. 5,597,398).

The optical glass manufactured by this method can be satisfactorily used for an optical glass for semiconductor manufacturing apparatuses, not just for optical fibers.

As the burners for glass syntheses used in the manufacture of the porous body for the optical fiber, multiple pipe burners wherein a plurality of discharge openings for each type of gas used in the synthesis of glass particles are provided in a concentric form or a multi-nozzle type burner wherein a plurality of discharge openings for a combustion-supporting gas are provided concentrically between a plurality of discharge openings for inflammable gasses, are known (refer to U.S. Pat. No. 4,810,189). These burners are generally made of a silica glass.

However, accompanying the increase in telecommunication demand in recent years, the demand for optical fiber has been increasing year by year. Thus, lowering the price of the optical fiber is desirable. In order to respond to this demand, the manufacturing speed of the optical fiber must be accelerated, the manufacture of optical fiber must be made more efficient, the optical fibers must be manufactured in large amounts, and the manufacturing cost must be reduced. Therefore, in order to manufacture a large amount of optical fiber at one time and thereby reduce the manufacturing cost, there is a trend to enlarge the size of the optical fiber preform used to form the optical fiber.

In addition, accompanying the increasing size of the semiconductor manufacturing apparatuses, the size of the optical glass for the semiconductor manufacturing apparatus is also enlarged.

When the size of the optical glass for the preform or the optical glass used for semiconductor manufacturing apparatuses is enlarged, for example, in the manufacture of optical glass by the OVD method or the like, improving the speed of depositing the glass particles on the outer circumference of the starting material (hereinafter referred to as "the deposition speed") and the efficiency of depositing the glass particles on the outer circumference of the starter material (hereinafter, referred to as "the deposition efficiency") is an extremely important problem.

The deposition speed of the glass particles can be improved by improving the synthesis speed of the glass particles. Thus, in order to improve the synthesis speed of the glass particles, it is necessary to lengthen the reaction time of the glass source material gas and to increase and the reaction temperature.

In addition, in order to increase the deposition efficiency of the glass particles, the temperature difference between the deposition surface for the glass particles and the flame that is ejected from the burner for glass synthesis must be made large, and the thermolytic effect (the effect wherein the glass particles receive a force that is proportional to the temperature gradient from each type of gas that is used in the synthesis of the glass particles) must be maximally used.

However, when the temperature of the flame is made high, the end face of the burner for glass synthesis is heated and may be fused and lost. When the burner for glass synthesis is lost, this burner for glass synthesis becomes unusable for the manufacture of the optical glass, and thus replacement of the burner for glass synthesis must be carried out frequently. Therefore, it is not possible to improve the deposition speed or deposition efficiency of the glass particles, and not possible to reduce the manufacturing cost.

In addition, when the end face of the burner for glass synthesis is deformed by loss due to heating, it is not possible to form a stable flame, and the deposition speed and the deposition efficiency of the glass particles decrease. Furthermore, there are the problems that glass fragments that are produced by the end face of the burner for glass synthesis being lost are deposited along with the glass particles, these glass fragments cause the production of bubbles and/or other defects (scratches and foreign particles) in the optical glass.

The present invention is provided in consideration of the problems described above, and an object of the present invention to provide a manufacturing method of optical glass that prevents deterioration of the burner used in synthesizing the glass particles that form the optical glass, and obtains an optical glass having a stable quality.

SUMMARY OF THE INVENTION

The applicant has discovered that the problem described above can be solved by providing an optical glass for a glass preform for an optical fiber or a semiconductor manufacturing device in which the number of residual bubbles with a diameter of 0.3 mm and more is $0.005/cm^3$ or less per unit volume.

Furthermore, in a manufacturing method of the optical glass comprising steps of introducing a glass source material gas, a doped gas, an inflammable gas, a combustion-supporting gas, and an inert gas into a burner for glass synthesis, synthesizing glass particles by making the glass source material gas undergo a hydrolysis reaction or an oxidizing reaction in a flame, and depositing these glass particles onto a starting material; the applicant has also discovered that the number of residual bubbles with a diameter of 0.3 mm and more can be limited to $0.005/cm^3$ or less per unit volume of the optical glass by controlling the temperature of the end face of the burner for glass synthesis during the deposition of the glass particles by regulating the flow velocity or the flow volume of the inflammable gas and the combustion-supporting gas to satisfy the predetermined relationship.

In the above manufacturing method of the optical glass, it is preferable that the temperature of the end face of the burner for glass syntheses is 900° C. or less.

Furthermore, in the above manufacturing method of the optical glass, when the flow velocity of the inflammable gas is denoted $v_H$, the flow velocity of the combustion-supporting gas is denoted $v_O$, and the relation therebetween is denoted by $v_H = v_O \cdot a$, it is preferable that $a \leq 0.2$.

Furthermore, in the above manufacturing method of the optical glass, when the flow volume of the inflammable gas is denoted $v_H$, the flow volume of the combustion-supporting gas is denoted $v_O$, and the relation therebetween is denoted by $v_O = v_H \cdot b$, it is preferable that $0.1 \leq b \leq 0.8$.

PREFERRED EMBODIMENTS OF THE INVENTION

In the following, the present invention will be explained in detail.

Figure 1:
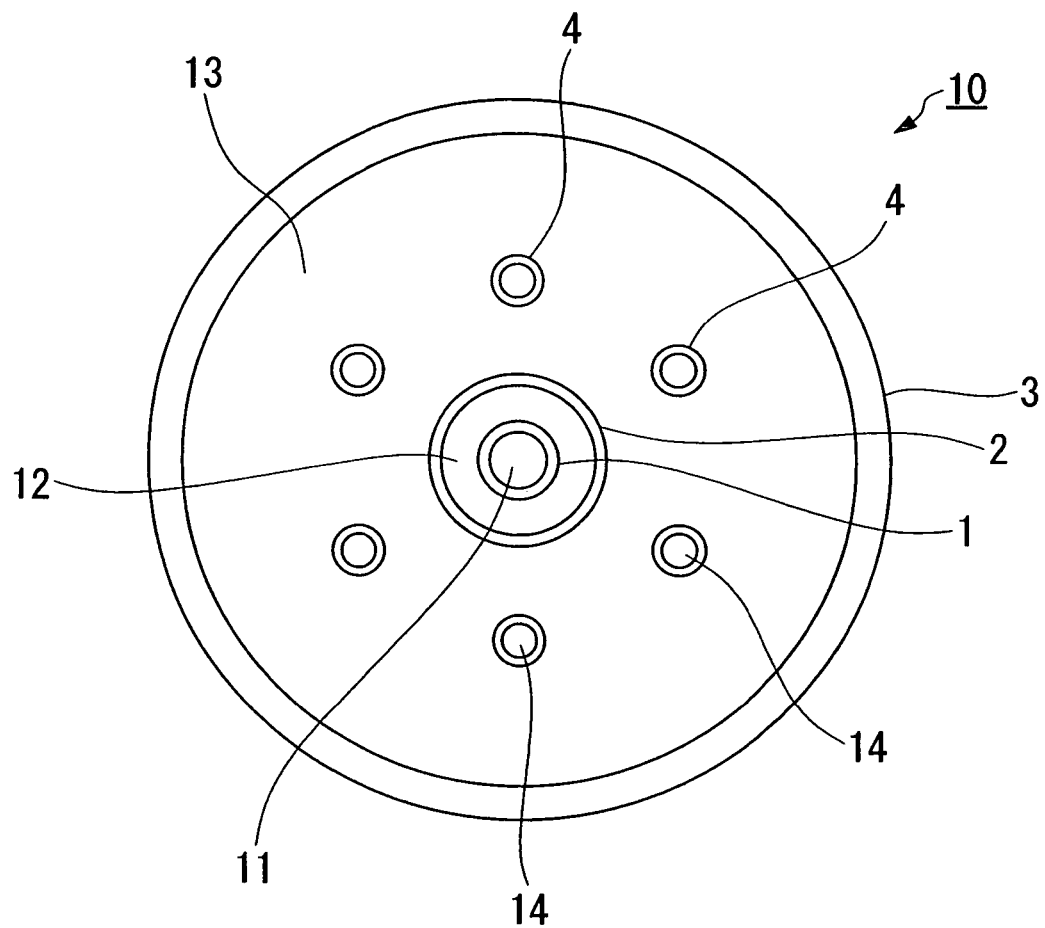
FIG. 1 is a schematic structural drawing showing an example of the burner for glass syntheses use in the manufacturing method of the optical glass of the present invention.

FIG. 1 is a schematic structural drawing showing an example of the burner for glass syntheses used in the manufacturing method for optical glass of the present invention.

At the end face of the burner 10 for glass syntheses, a first nozzle 1 is provided at the center thereof, around of the first nozzle 1, a second nozzle 2 is coaxially provided with the first nozzle 1, and furthermore, around the second nozzle 2, a third nozzle 3 is coaxially provided with the first nozzle 1. In addition, between the second nozzle 2 and the third nozzle 3, a plurality of small diameter nozzles 4 having equal inner diameters and outer diameters are provided concentrically around the first nozzle 1.

Furthermore, the first nozzle 1 forms a first discharge opening 11, the portion between the first nozzle 1 and the second nozzle 2 forms as a second discharge opening 12, the portion between the second nozzle 2 and the third nozzle 3 forms as a third discharge opening 13, and the small diameter nozzles 4 form a fourth discharge opening 14.

In the OVD method, to synthesize the glass particles, generally a glass source material gas such as $SiCl_4$ and dopant gases such as oxygen and hydrogen are supplied from the first discharge opening 11, an inert gas such as argon is supplied from the second discharge opening 12, an inflammable gas such as hydrogen is supplied from the third discharge opening 13, and a combustion-supporting gas such as oxygen is supplied from the fourth discharge opening 14.

The burner 10 for glass synthesis has a cylindrical shape with an external diameter of about 40 to 60 mm, and is generally formed by silica glass. Furthermore, with respect to the nozzles that form the burner 10 for glass synthesis, the inner diameter of the first nozzle 1 is about 3 to 6 mm, the inner diameter of the second nozzle 2 is about 4 to 7 mm, the inner diameter of the third nozzle 3 is about 30 to 35 mm, and the inner diameter of each small diameter nozzles 4 is about 1 to 2 mm.

Moreover, in FIG. 1, an example of the burner for glass synthesis used in the manufacturing method of the optical glass of the present invention is shown, however, the burner for glass synthesis used in the manufacturing method of the optical glass of the present invention is not limited to this. The burner for glass synthesis used in the manufacturing method of the optical glass of the present invention may have a structure that resembles that of the burner for glass synthesis shown in FIG. 1.

Below, the manufacturing method for the optical glass of the present invention will be explained.

Figure 2:
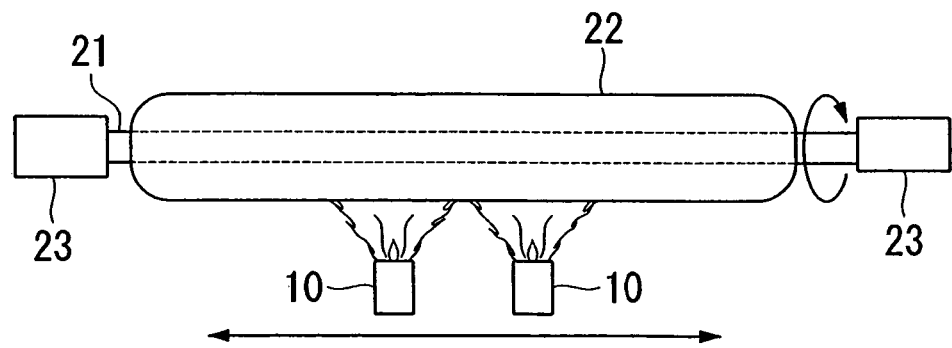
FIG. 2 is a schematic structural drawing showing the manufacturing method of the optical glass of the present invention.

FIG. 2 is a schematic explanatory drawing showing the manufacturing method of the optical glass of the present invention.

In the manufacturing method of the optical glass of the present invention, a cylindrical starting member 21 comprising silica glass or the like is prepared. Next, both ends of the starting member 21 are held by holding tools 23, 23, and the starting member 21 is disposed horizontally. Then in this condition, the starting member 21 is rotated centered on its central axis. Next, using one or more burner for glass synthesis 10, a glass source material gas or a dopant gas is supplied from the first discharge opening 11 of the burner 10 for glass synthesis, an inert gas is supplied from the second discharge opening 12, an inflammable gas is supplied from a third discharge opening 13, and a combustion-supporting gas is supplied from the fourth discharge openings 14; and then, the glass particles are synthesized by a hydrolysis reaction or an oxidizing reaction in the flame of the burner 10 for glass synthesis. Furthermore, while the burner 10 for glass synthesis is moved parallel to a longitudinal direction of the starting member 21 (the direction denoted by an arrow in the figure), a porous body 22 is obtained by depositing glass particles on the outer periphery of the rotating starting member. This porous body 22 is converted to a transparent glass by sintering, and thereby the optical glass is obtained. In FIG. 2, an example of the manufacturing method of the optical glass is shown, however, the manufacturing method of the optical glass of the present invention is not limited to this.

As a method for enlarging the flame discharging from the burner 10 for glass synthesis in order to improve the deposition speed and deposition efficiency of the glass particles, there is a method in which the cross-sectional area of the burner for glass synthesis is enlarged. However, when the cross-sectional area of the burner 10 for glass synthesis is enlarged, the flow velocity of each type of gas used in the synthesis of the glass particles slows. In addition, when the flow velocity of the gas slows, the flame forms in proximity to the end face of the burner 10 for glass synthesis, and simultaneously, a hydrolytic reaction and an oxidizing reaction occur. Thereby, heat is generated in proximity to the end face of the burner 10 for glass synthesis, and consequently, the end face of the burner 10 for glass synthesis may be lost.

Thus, in the manufacturing method of the optical glass of the present invention, the flow velocity or the flow volume of the inflammable gas that is discharged from the third discharge opening 13 and the combustion-supporting gas that is discharged from the fourth discharge opening 14 during the deposition of the glass particles are regulated. Thereby, the position of the formation of the flame is separated from the end face of the burner 10 for glass synthesis, and the generation of high heat in proximity to the end face of the burner 10 for glass synthesis can be prevented.

In this manner, it is possible to prevent loss and deterioration of the end face of the burner 10 for glass synthesis due to the heat of the flame, and as a result, it is possible to decrease the number of times that the burner 10 for glass synthesis is replaced. Furthermore, because deformation due to the heat of the burner 10 for glass synthesis is prevented, it is always possible to form a stable flame, and it is possible to prevent the lowering of the deposition speed and deposition efficiency of the glass particles. In addition, it is possible to prevent the deposition of glass fragments that occur when the end face from burner for glass synthesis is lost along with the deposition of the glass particles, and it is possible to prevent incorporation of bubbles into the optical glass that has been obtained by sintering the porous body.

In addition, in the manufacturing method of the optical glass of the present invention, the end face temperature of the burner 10 for glass synthesis is preferably be 900° C. or less, and more preferably be 800° C. or less, which is attained by regulating the flow velocity or the flow volume of the inflammable gas that is discharged from the third discharge opening 13 and the combustion-supporting gas discharged from the fourth discharge opening 14 during the deposition of the glass particles. In this manner, it is possible to prevent loss of the end face of the burner 10 for glass syntheses due to the heat of the oxy-hydrogen flame. In addition, it is possible to prevent the incorporation of bubbles into the optical glass obtained by the manufacturing method of the optical glass of the present invention.

In addition, in the manufacturing method of the optical glass of the present invention, when the flow velocity of the inflammable gas or the combustion-supporting gas is regulated during deposition of the glass particles and where the flow velocity of the inflammable gas is denoted $v_H$ and the flow velocity of the combustion-supporting gas is denoted $v_O$ and the relationship therebetween is given as $v_H = v_O \cdot a$, it is preferable that $a \leq 0.2$. That is, in the manufacturing method of the optical glass of the present invention, the flow velocity of the inflammable gas $v_H$ is always preferably be slower than the flow velocity of the combustion-supporting gas $v_O$ within the predetermined range.

When a is more than 0.2, a flame is formed in proximity to the end face of the burner 10 for glass synthesis, and a hydrolysis reaction or oxidizing reaction occurs. Therefore, heat is generated in proximity to the burner 10 for glass synthesis, the burner 10 for glass syntheses may melt, and the end surface thereof may be lost.

In addition, during the deposition of the glass particles, when the flow volume of the inflammable gas and the combustion-supporting gas are regulated and where the flow volume of the inflammable gas is denoted $V_H$ and the flow volume of the combustion-supporting gas is denoted $V_O$ and the relationship therebetween is given as $V_O = V_H \cdot b$, it is preferable that $0.1 \leq b \leq 0.8$. That is, in the manufacturing method of the optical glass of the present invention, the flow volume of the inflammable gas $V_H$ is always preferably be less than the flow volume of the combustion-supporting gas $V_O$ within the predetermined range.

When b is less than 0.1, a flame is formed in proximity to the burner 10 for glass synthesis, and a hydrolysis reaction or an oxidizing reaction occurs. Therefore, heat is generated in proximity to the burner for glass synthesis 10, the burner for glass syntheses 10 may melt, and the end surface thereof may be lost. In addition, when b exceeds 0.8, the flow velocity of the combustion-supporting gas is too fast and the flame is not concentrated, and the deposition speed and the deposition velocity of the glass particles decreases.

In addition, the number of residual bubbles with a diameter of 0.3 mm and more incorporated into the optical glass obtained by the manufacturing method of the optical glass of the present invention is controlled to $0.005/cm^3$ or less. In contrast, the residual bubbles with a diameter less than 0.3 mm do not have notable effect to the subsequent processes and optical properties of the glass. In this manner, according to the manufacturing method of the optical glass of the present invention, it is possible to obtain a desirable optical glass. Furthermore, size of the residual bubbles are measured by irradiating light from the end of the optical glass and by comparing the size toward a scale in which a hole having a diameter of 0.3 mm is drawn.

In the following, the invention will be explained with reference to the concrete embodiments shown in FIG. 1 and FIG. 2.

Embodiment 1

The burner apparatus for manufacturing an optical glass providing the burner for glass synthesis shown in FIG. 1 was prepared.

Next, a cylindrical starting material comprising a silica glass having an outer diameter of 30 mm and a length of 1500 mm was prepared.

Next, both ends of this starting material are held by a holding tool, and the starting material was disposed horizontally.

Next, the starting material was rotated on the center axis thereof, and at the same time, glass particles were synthesized using this burner for glass synthesis. The glass particles were deposited on the outer periphery of the rotating starting material, while moving the burner for glass synthesis parallel to the longitudinal direction of the starting material, and a cylindrical porous body 22 having deposited 12 kg of glass particles that comprise $SiO_3$ on the periphery thereof was obtained.

At this time, the rotation speed of the starting member was 30 rpm. In addition, from the first discharge opening 11, $SiCl_4$, which was the glass source material gas, was discharged at a flow volume of 5 liters/minute, and oxygen, which was the dopant gas, was discharged at a flow volume of 3 liters/minute. From the second discharge opening 12, argon was discharged at a flow volume of 1 liter/minute. From the third discharge opening 13, hydrogen was discharged. The flow volume of the hydrogen depends on the increase in the external diameter of the porous body 22, and was regulated such that the flow velocity was 1.0 to 1.3 m/second. Furthermore, from the fourth discharge opening 14, oxygen was discharged, and the flow volume was regulated such that the flow velocity was 12.0 m/second. At this time, in the relationship $v_H = v_O \cdot a$, $a = 0.05$ to 0.065.

Under these conditions, during the deposition of the glass particles, the end face temperature of the burner 10 for glass synthesis which was measured by a non-contact type radiation thermometer was 400 to 600° C.

Furthermore, when irradiating light from the end of the optical glass which was obtained by sintering the porous body manufactured by the manufacturing method described above, the number of residual bubbles with a diameter of 0.3 mm and more incorporated into the optical glass was $0.0007/cm^3$ or less.

Furthermore, when the manufacture of the porous body was carried out repeatedly under these conditions, the amount of bubbles found in the optical glass obtained after sintering of the porous body was equal to or less than $0.005/cm^3$. In addition, no loss of the burner 10 for glass synthesis was observed.

Embodiment 2

From the first discharge opening 11, $SiCl_4$, which was the glass source material gas, was discharged at a flow volume of 5 liters/minute, and oxygen, which was the dopant gas, was discharged at a flow volume of 3 liters/minute. From the second discharge opening 12, argon was discharged at a flow volume of 1 liter/minute. From the third discharge opening 13, hydrogen was discharged. The flow volume of the hydrogen depends on the increase in the external diameter of the porous body 22, and was regulated such that the flow volume was 40 to 80 liters/minute. Furthermore, from the fourth discharge opening 14, oxygen was discharged at the flow volume was 20 liters/minute. Other conditions were similar to those of Embodiment 1, and the under above conditions, the cylindrical porous body 22 was manufactured. At this time, in the relationship $V_O = V_H \cdot b$, b=0.23 to 0.50.

Under these conditions, during the deposition of the glass particles, the end face temperature of the burner 10 for glass synthesis which was measured by the non-contact type radiation thermometer was 600 to 850° C.

Furthermore, when irradiating light from the end of the optical glass which was obtained by sintering the porous body manufactured by the manufacturing method described above, the number of residual bubbles with a diameter of 0.3 mm and more incorporated into the optical glass was 0.0018/cm³ or less.

Furthermore, when the manufacture of the porous body was carried out repeatedly under these conditions, the amount of bubbles found in the optical glass obtained after sintering of the porous body was equal to or less than 0.005/cm³. In addition, no loss of the burner 10 for glass synthesis was observed.

Embodiment 3

From the first discharge opening 11, SiCl₄, which was the glass source material gas, was discharged at a flow volume of 5 liters/minute, and oxygen, which was the dopant gas, was discharged at a flow volume of 3 liters/minute. From the second discharge opening 12, argon was discharged at a flow volume of 1 liter/minute. From the third discharge opening 13, hydrogen was discharged, and the flow volume was regulated such that the flow velocity was 1.2 m/second. Furthermore, from the fourth discharge opening 14, oxygen was discharged. The flow volume of the oxygen depends on the increase in the external diameter of the porous body 22, and was regulated such that the flow velocity was 6 to 16 m/second. Other conditions were similar to those of Embodiment 1, and the under above conditions, the cylindrical porous body 22 was manufactured. At this time, in the relationship $v_H = v_O \cdot a$, a=0.075 to 0.2.

Under these conditions, during the deposition of the glass particles, the end face temperature of the burner 10 for glass synthesis which was measured by the non-contact type radiation thermometer was 600 to 900° C.

Furthermore, when irradiating light from the end of the optical glass which was obtained by sintering the porous body manufactured by the manufacturing method described above, the number of residual bubbles with a diameter of 0.3 mm and more incorporated into the optical glass was 0.0030/cm³ or less.

Furthermore, when the manufacture of the porous body was carried out repeatedly under these conditions, the amount of bubbles found in the optical glass obtained after sintering of the porous body was equal to or less than 0.005/cm³. In addition, no loss of the burner 10 for glass synthesis was observed.

Embodiment 4

From the first discharge opening 11, SiCl₄, which was the glass source material gas, was discharged at a flow volume of 5 liters/minute, and oxygen, which was the dopant gas, was discharged at a flow volume of 3 liters/minute. From the second discharge opening 12, argon was discharged at a flow volume of 1 liter/minute. From the third discharge opening 13, hydrogen was discharged at the flow volume was 60 liter/minute. Furthermore, from the fourth discharge opening 14, oxygen was discharged. The flow volume of the oxygen depends on the increase in the external diameter of the porous body 22, and was regulated such that the flow volume was 25 to 45 liters/minute. Other conditions were similar to those of Embodiment 1, and the under above conditions, the cylindrical porous body 22 was manufactured. At this time, in the relationship $V_O = V_H \cdot b$, b=0.42 to 0.75.

Under these conditions, during the deposition of the glass particles, the end face temperature of the burner 10 for glass synthesis which was measured by the non-contact type radiation thermometer was 400 to 700° C.

Furthermore, when irradiating light from the end of the optical glass which was obtained by sintering the porous body manufactured by the manufacturing method described above, the number of residual bubbles with a diameter of 0.3 mm and more incorporated into the optical glass was 0.0006/cm³ or less.

Furthermore, when the manufacture of the porous body was carried out repeatedly under these conditions, the amount of bubbles found in the optical glass obtained after sintering of the porous body was equal to or less than 0.005/cm³. In addition, no loss of the burner 10 for glass synthesis was observed.

COMPARATIVE EXAMPLE 1

From the first discharge opening 1, SiCl₄, which was the glass source material gas, was discharged at a flow volume of 5 liters/minute, and oxygen, which was the dopant gas, was discharged at a flow volume of 3 liters/minute. From the second discharge opening 12, argon was discharged at a flow volume of 1 liter/minute. From the third discharge opening 13, hydrogen was discharged. The flow volume of the hydrogen depends on the increase in the external diameter of the porous body 22, and was regulated such that the flow velocity was 0.8 to 1.3 m/second. From the fourth discharge opening 14, oxygen was discharged, and the flow volume thereof was regulated such that the flow velocity was 3.0 m/second. Other conditions were similar to those of Embodiment 1, and the under above conditions, the cylindrical porous body 22 was manufactured. At this time, in the relationship $v_H = v_O \cdot a$, a=0.27 to 0.43.

Under these conditions, during the deposition of the glass particles, the end face temperature of the burner 10 for glass synthesis which was measured by the non-contact type radiation thermometer was 950 to 1050° C.

Furthermore, when irradiating light from the end of the optical glass which was obtained by sintering the porous body manufactured by the manufacturing method described above, the number of residual bubbles with a diameter of 0.3 mm and more incorporated into the optical glass was 0.008/cm³ or less.

Furthermore, when the manufacture of the porous body was carried out repeatedly under these conditions, the end face temperature of the burner 10 for glass synthesis was gradually increased to 1000 to 1100° C., and the amount of bubbles found in the optical glass obtained after sintering of the porous body was increased to 0.012/cm$^3$. In addition, the deposition speed and the deposition efficiency of the glass particles gradually decreased, and loss of the end face thereof was found when observing the burner 10 for glass synthesis after manufacturing the porous body 50 times.

COMPARATIVE EXAMPLE 2

From the first discharge opening 1, SiCl$_4$, which was the glass source material gas, was discharged at a flow volume of 5 liters/minute, and oxygen, which was the dopant gas, was discharged at a flow volume of 3 liters/minute. From the second discharge opening 12, argon was discharged at a flow volume of 1 liter/minute. From the third discharge opening 13, hydrogen was discharged. The flow volume of the hydrogen depends on the increase in the external diameter of the porous body 22, and was regulated such that the flow velocity was 1.2 to 1.5 m/second. From the fourth discharge opening 14, oxygen was discharged. The flow volume of the oxygen depends on the increase in the external diameter of the porous body 22, and was regulated such that the flow velocity was 2.8 to 3.2 m/second. Other conditions were similar to those of Embodiment 1, and the under above conditions, the cylindrical porous body 22 was manufactured. At this time, in the relationship $v_H = v_O \cdot a$, a=0.33 to 0.50.

Under these conditions, during the deposition of the glass particles, the end face temperature of the burner 10 for glass synthesis which was measured by the non-contact type radiation thermometer was 980 to 1120° C.

Furthermore, when irradiating light from the end of the optical glass which was obtained by sintering the porous body manufactured by the manufacturing method described above, the number of residual bubbles with a diameter of 0.3 mm and more incorporated into the optical glass was 0.010/cm$^3$ or less.

Furthermore, when the manufacture of the porous body was carried out repeatedly under these conditions, the end face temperature of the burner 10 for glass synthesis was gradually increased to 1150 to 1300° C., and the amount of bubbles found in the optical glass obtained after sintering of the porous body was increased to 0.015/cm$^3$. In addition, the deposition speed and the deposition efficiency of the glass particles gradually decreased, and loss of the end face thereof was found when observing the burner 10 for glass synthesis after manufacturing the porous body 50 times.

COMPARATIVE EXAMPLE 3

From the first discharge opening 1, SiCl$_4$, which was the glass source material gas, was discharged at a flow volume of 5 liters/minute, and oxygen, which was the dopant gas, was discharged at a flow volume of 3 liters/minute. From the second discharge opening 12, argon was discharged at a flow volume of 1 liter/minute. From the third discharge opening 13, hydrogen was discharged at a flow flow volume of 70 to 110 liters/minute. From the fourth discharge opening 14, oxygen was discharged at a flow volume of 10 to 20 liters/minute. Other conditions were similar to those of Embodiment 1, and the under above conditions, the cylindrical porous body 22 was manufactured. At this time, in the relationship $V_O = V_H \cdot b$, b=0.09 to 0.29.

Under these conditions, during the deposition of the glass particles, the end face temperature of the burner 10 for glass synthesis which was measured by the non-contact type radiation thermometer was 780 to 1150° C. In addition, when a range of b<0.1 in the relationship $V_O = V_H \cdot b$, it was observed that the end face of the burner 10 for glass synthesis showed red heat.

Furthermore, when irradiating light from the end of the optical glass which was obtained by sintering the porous body manufactured by the manufacturing method described above, the number of residual bubbles with a diameter of 0.3 mm and more incorporated into the optical glass was 0.012/cm$^3$ or less.

Furthermore, when the manufacture of the porous body was carried out repeatedly under these conditions, the end face temperature of the burner 10 for glass synthesis was gradually increased to 1000 to 1200° C., and the amount of bubbles found in the optical glass obtained after sintering of the porous body was increased to 0.018/cm$^3$. In addition, the deposition speed and the deposition efficiency of the glass particles gradually decreased, and loss of the end face thereof was found when observing the burner 10 for glass synthesis after manufacturing the porous body 50 times.

COMPARATIVE EXAMPLE 4

From the first discharge opening 1, SiCl$_4$, which was the glass source material gas, was discharged at a flow volume of 5 liters/minute, and oxygen, which was the dopant gas, was discharged at a flow volume of 3 liters/minute. From the second discharge opening 12, argon was discharged at a flow volume of 1 liter/minute. From the third discharge opening 13, hydrogen was discharged at a flow volume of 35 to 80 liters/minute. From the fourth discharge opening 14, oxygen was discharged at a flow flow volume of 30 to 60 liters/minute. Other conditions were similar to those of Embodiment 1, and the under above conditions, the cylindrical porous body 22 was manufactured.

As a result, when a range of b>0.8 in the relationship $V_O = V_H \cdot b$, flames could not be concentrated and the deposition of the glass particles could not be performed.

Figure 3:
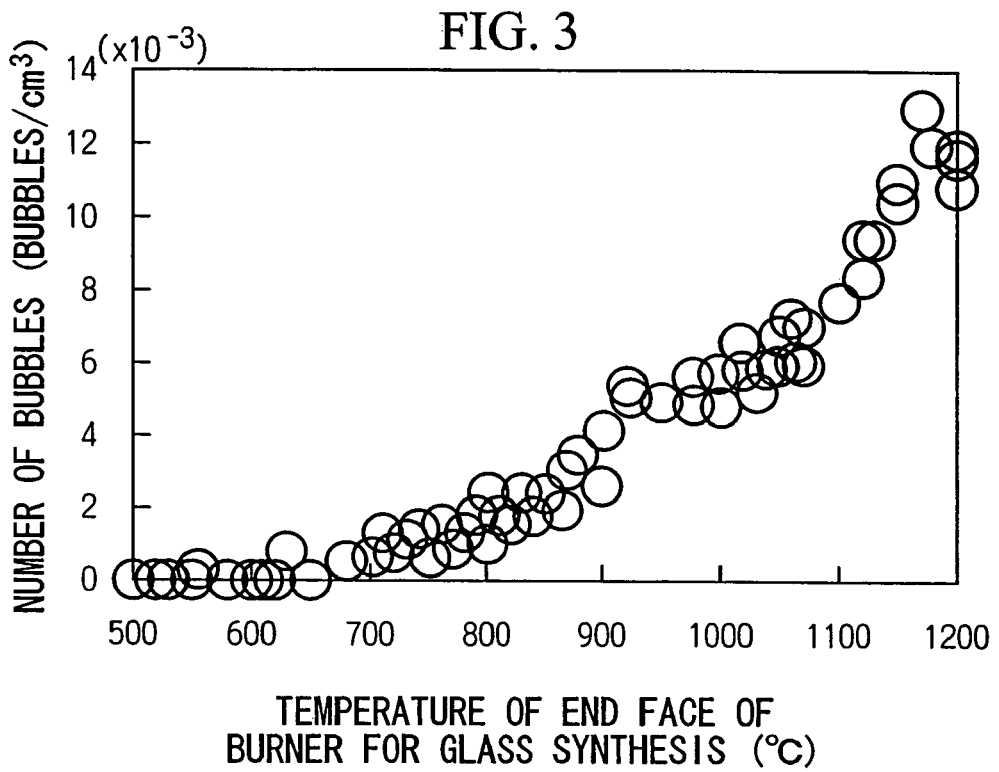
FIG. 3 is a graph showing the relationship between the temperature of the end face of the burner for glass synthesis in the embodiment and the comparative example and the number of bubbles generated in the optical glass.

FIG. 3 shows the relationship between the end face temperature of the burner for glass synthesis in the above embodiments 1 to 4 and the comparative examples 1 to 4 and the number of bubbles generated in the optical glass obtained by sintering the porous body.

Figure 4:
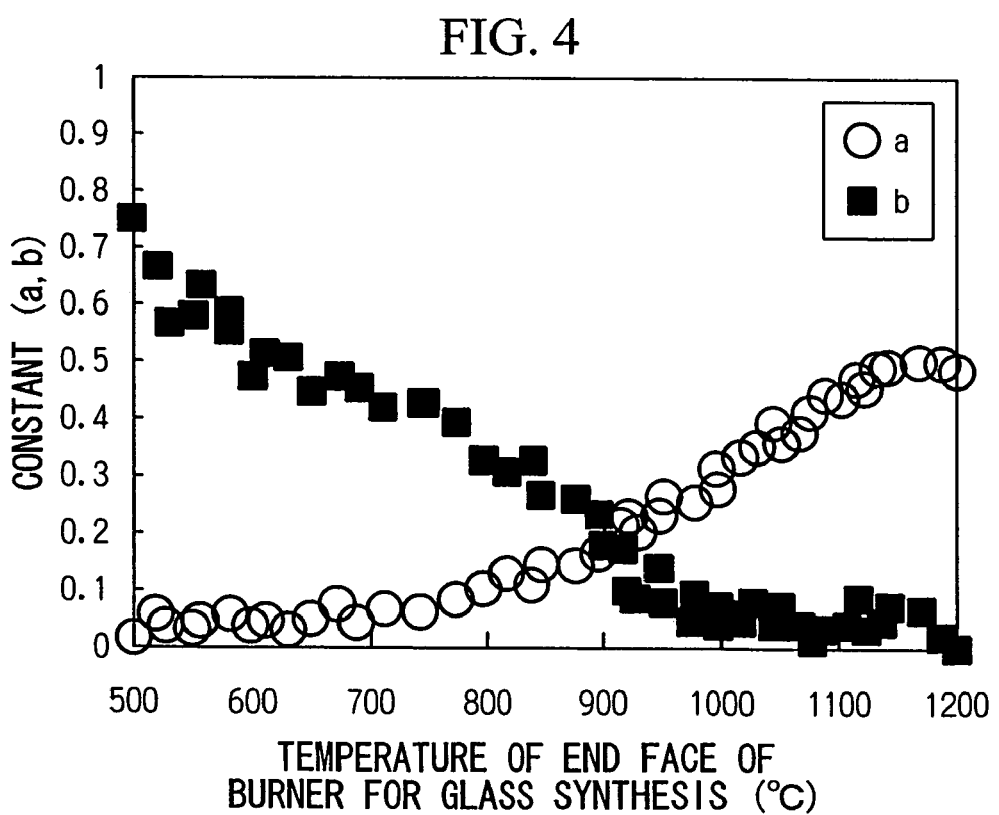
FIG. 4 is a graph showing the relationship between the temperature of the end face of the burner for glass synthesis in the embodiment and the comparative example and the constants a, b.

FIG. 4 shows the relationship between the temperature of the end face of the burner for glass synthesis in the embodiment and the comparative example and the constants a in the equation $v_H = v_O \cdot a$ and b in the equation $V_O = V_H \cdot b$.

It can be understood from FIG. 3 that accompanying the rise in the face temperature of the burner 10 for glass synthesis, the number of bubbles found n the optical glass obtained by sintering the porous body increased. Furthermore, it can be understood from FIG. 4 that the face temperature of the burner 10 for glass synthesis can be controlled by regulating the flow velocity or the flow volume of the inflammable gas and the combustion-supporting gas. From the above, it is possible to inhibit the incorporation of bubbles into the optical glass obtained by sintering the porous body by controlling the end face temperature of the burner 10 for glass synthesis.

The invention claimed is:

1. A manufacturing method of an optical glass comprising steps of:
    introducing a glass source material gas, a doped gas, an inflammable gas, a combustion-supporting gas, and an inert gas into a burner for glass synthesis;
    synthesizing glass particles by making the glass source material gas undergo a hydrolysis reaction or an oxidizing reaction in a flame; and
    depositing these glass particles onto a starting material;
    wherein a number of residual bubbles with a diameter of 0.3 mm and more is limited to 0.005/cm$^3$ or less per unit volume of the optical glass by controlling the temperature of an end face of said burner for glass synthesis during the deposition of said glass particles by regulating the flow velocity of said inflammable gas and said combustion-supporting gas such that the flow velocity of said inflammable gas is less than the flow velocity of said combustion-supporting gas.

2. A manufacturing method of an optical glass comprising steps of:
introducing a glass source material gas, a doped gas, an inflammable gas, a combustion-supporting gas, and an inert gas into a burner for glass synthesis;
synthesizing glass particles by making the glass source material gas undergo a hydrolysis reaction or an oxidizing reaction in a flame; and
depositing these glass particles onto a starting material;
wherein a number of residual bubbles with a diameter of 0.3 mm and more is limited to $0.005/cm^3$ or less per unit volume of the optical glass by controlling the temperature of an end face of said burner for glass synthesis during the deposition of said glass particles by regulating the flow volume of said inflammable gas and said combustion-supporting gas such that the flow volume of said inflammable gas is larger than the flow volume of said combustion-supporting gas.

3. A manufacturing method of the optical glass according to claim 1, wherein the temperature of the end face of said burner for glass syntheses is 900° C. or less.

4. A manufacturing method of the optical glass according to claim 2, wherein the temperature of the end face of said burner for glass syntheses is 900° C. or less during the deposition of the glass particles.

5. A manufacturing method of the optical glass according to claim 1, when the flow velocity of said inflammable gas is denoted vhd H, the flow velocity of said combustion-supporting gas is denoted $v_O$, and the relation therebetween is denoted by $v_H = v_O \cdot a$, $a \leq 0.2$.

6. A manufacturing method of the optical glass according to claim 3, when the flow velocity of said inflammable gas is denoted $v_H$, the flow velocity of said combustion-supporting gas is denoted $v_O$, and the relation therebetween is denoted by $v_H = v_O \cdot a$, $a \leq 0.2$.

7. A manufacturing method of the optical glass according to claim 2, when the flow volume of said inflammable gas is denoted $V_H$, the flow volume of said combustion-supporting gas is denoted $V_O$, and the relation therebetween is denoted by $V_O = V_H \cdot b$, $0.1 \leq b \leq 0.8$.

8. A manufacturing method of the optical glass according to claim 4, when the flow volume of said inflammable gas is denoted $V_H$, the flow volume of said combustion-supporting gas is denoted $V_O$, and the relation therebetween is denoted by $V_O = V_H \cdot b$, $0.1 \leq b \leq 0.8$.

* * * * *